Patented Feb. 1, 1949

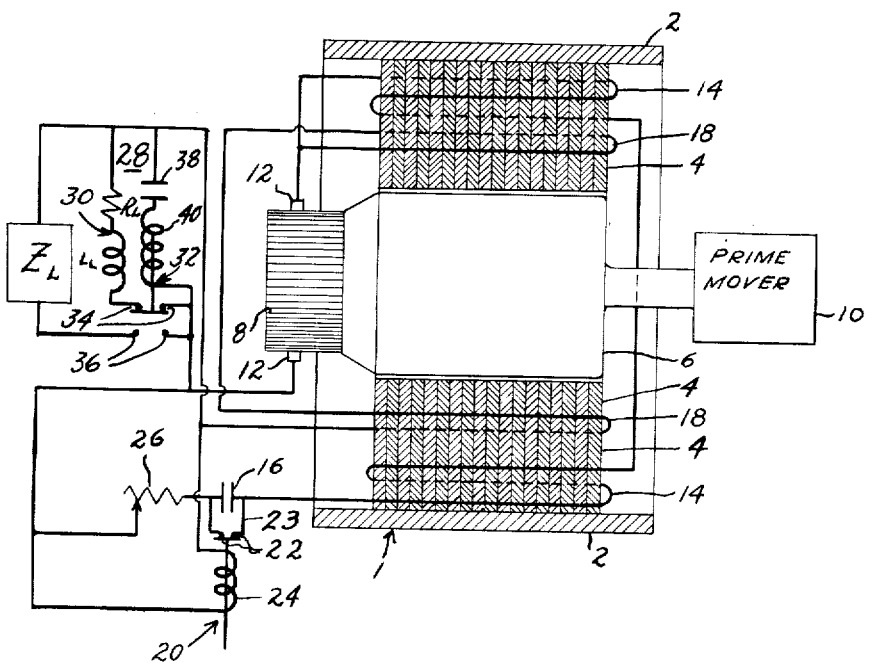

2,460,714

UNITED STATES PATENT OFFICE 2,460,714

ALTERNATING CURRENT GENERATOR

Carl S. Roys, West Chicago, Ill., assignor, by mesne assignments, to Nader Engineering Company, a corporation of Illinois Application March 29, 1946, Serial No. 658,061

8 Claims. (Cl. 171—209)

This invention relates to a dynamoelectric machine and particularly to an improved method and apparatus for controlling the operation of a self-excited, commutator type, alternating current generator.

This application constitutes a continuation-in-part of the subject matter disclosed in my copending application Serial No. 658,060, filed on even date herewith.

In my copending application, there is disclosed and claimed an improved alternating current commutator type dynamoelectric machine and in particular, a self-excited, alternating current generator characterized by the inclusion of a capacitive reactance in series relation with an exciting field winding of the generator. As is more fully discussed in the copending application, generators of this type have unusual and improved electrical characteristics and, in particular, will generate an alternating current voltage whose frequency is substantially independent of variations in speed of the generator or of the character of the load supplied by the generator.

It has been found that under certain load conditions, some difficulty may be experienced with a self-excited alternating current generator of the type disclosed in my copending application in obtaining the initial build-up of the generator as an alternating current generator. A feature of this invention is the provision of an improved method and apparatus for insuring the build-up of generated voltage of a self-excited, commutator type, alternating current generator. In accordance with this invention the generator is permitted to initially build up a generated voltage as a D. C. generator, which it will readily do, and then the generator is converted to function as an A. C. generator.

A further feature of this invention relates to the provision of a safety device to protect certain types of loads, which would be injured by application of a D. C. voltage thereto, from the effects of the D. C. voltage produced during the initial build-up of the generator. The protective arrangement is characterized by the provision of an artificial load and a relay for selectively connecting the artificial load across the generator while it is building up as a D. C. generator and then substituting the regular load across the terminals of the generator when it is converted to A. C. operation.

Accordingly it is an object of this invention to provide an improved self-excited, commutator type, alternating current generator.

A further object of this invention is to provide an improved method and apparatus for controlling the operation of a self-excited, commutator type, alternating current generator.

A particular object of this invention is to provide a method and apparatus for controlling the operation of a self-excited, commutator type, alternating current generator in such manner as to insure that such generator will build up a generated alternating current voltage, characterized by the operation of the generator initially as a D. C. generator to obtain a build-up of generated voltage and then the conversion of the generator to A. C. generation.

Another object of this invention is to provide an improved apparatus for controlling the operation of a self-excited, commutator type, alternating current generator, of the type having a capacitive reactance connected in series with an exciting field winding, characterized by the provision of a normally closed relay having its contacts arranged to provide a direct current conducting path in shunt to the capacitive reactance and the coil of the relay arranged to be energized by the voltage generated by the generator.

A further object of this invention is to provide an improved apparatus for protecting a load circuit supplied by an alternating current generator from D. C. current produced by such generator during the initial voltage build-up of the generator.

The specific nature of this invention, as well as other objects and advantages thereof will be apparent to those skilled in the art from the following detailed description of the annexed sheet of drawings which, by way of preferred example only, illustrates one embodiment of the invention.

On the drawings the single figure is a diagrammatic view of a self-excited, alternating current, commutator type generator and associated control elements therefor embodying this invention.

As shown on the drawings:

The generator 1 comprises a self-excited, commutator type dynamoelectric machine of a type more fully described in my above identified copending application. Generator 1 is provided with a frame 2 on which are supported in conventional manner a plurality of laminated field poles 4. An armature 6 is suitably mounted for rotation within the frame 2 and is provided with the usual armature winding (not shown). The end connections of the armature winding are brought out to a commutator 8 and brushes 12 are provided to effect electrical connection with the armature winding. A prime mover 10 drives the armature 8 and, while not limited thereto, prime mover 10 may comprise a varying speed unit such as an aircraft engine, inasmuch as the frequency characteristics of the generator 1 are substantially independent of the speed at which the armature 8 is rotated.

A primary exciting field winding 14 is provided which is here shown as a self-excited winding being connected in shunt across the brushes 12. Any suitable capacitive reactance, such as the condenser 16 is connected in series circuit with exciting field winding 14 and the inductive and capacitive reactance of the field winding circuit may be controlled to obtain a desired output frequency in the manner more fully described in my copending application. If desired a field excitation adjusting resistor 26 may also be connected in series with exciting field winding 14 to thereby provide a convenient adjustment of the voltage characteristics of the generator.

Preferably a compensating field winding 18 is also provided. While compensating winding 18 is here shown as being energized in series with the armature of generator 1, it should be understood that any conventional arrangement of compensating winding may be utilized, including a short circuited winding. In accordance with the teachings of my copending application, the compensating winding 18 is preferably constructed to substantially neutralize the armature reaction to thereby achieve more desirable output frequency characteristics.

With a generator construction as described, an output alternating current voltage will be generated whose frequency is substantially independent of the speed of the prime mover 10 or of the charatcer of the load $Z_L$; however, under certain load conditions, it has been found that some difficulty may be encountered in getting the generator 1 to initially build up its generated alternating current voltage. In accordance with this invention, an improved method for assuring the operation of the generator 1 as an alternating current generator comprises the provision of a direct current conducting path in shunt to the condenser 16. In the simplest form, such conducting path may comprise a short circuit, but it should be understood that other forms of direct current conducting paths including both resistance and inductance elements may be utilized if desired. This direct current conducting path in shunt to the condenser converts the generator 1 to substantially a self-excited, direct current generator and it will immediately build up a generated D. C. voltage without difficulty. Upon the attainment of a substantial generated D. C. voltage, the method of this invention contemplates the opening of the direct current conducting path in shunt to the condenser 16. This action immediately interrupts the functioning of the generator as a D. C. generator and, due to the magnetic fields which have been built up in the generator during its D. C. operation, the generator immediately converts to A. C. operation, generating an alternating current voltage at a frequency determined by the constants of the reactances in the exciting field winding circuit.

One form of apparatus for conveniently accomplishing the aforedescribed method of operation comprises a normally closed relay 20 having the contacts 22 thereof connected to close a direct current conducting path 28 in shunt to the condenser 16, which is here shown as constituting a shorting connection around such condenser. The coil 24 of relay 20 is connected across the output terminals of the generator 1 and is arranged to open the contacts 22 when the generator 1 generates a D. C. or A. C. voltage of substantial magnitude. With the apparatus described, the generator 1 will always build up and function as an alternating current generator, inasmuch as the condenser 16 is initially shorted by the contacts 22 of relay 20, hence permitting operation of generator 1 as a D. C. generator until a generated voltage sufficient to operate relay 20 is produced, whereupon the contacts 22 are opened and the condenser 16 effectively reinserted in the exciting field winding circuit. Upon this occurrence the generator 1 immediately converts to A. C. generation.

In some applications the character of the load $Z_L$ may be such that the momentary generation of a D. C. voltage by the generator 1 during its build-up period may be harmful to the load $Z_L$. In that event, a protective circuit 28 may be added to assure that the load $Z_L$ will be subject to only alternating current. The protective circuit 28 comprises a dummy load 30 which will conduct direct current and may include resistance components $R_L$ and inductive components $L_L$. The dummy load 30 is selectively connected across the output terminals of the generator 1 in the place of the load $Z_L$ by a selector relay 32.

Selector relay 32 has a pair of normally closed contacts 34 which are arranged to complete the connection of dummy load 30 across the output terminals of generator 1 and also a pair of normally open contacts 36 which complete the connection of the load $Z_L$ across the output terminals of generator 1. The essential characteristic of selector relay 32 is that it will operate only upon A. C. energization of its coil 40. Selector relay 32 may thus comprise any one of several well known forms of A. C. operated relays, or may constitute a conventional relay having a condenser 38 connected in series therewith to insure that the relay will function only upon the application of alternating current thereto. The coil 40 of relay 32 is then connected through condenser 38 across the output terminals of generator 1.

With the above described arrangement, the dummy load 30 is connected across the output terminals of generator 1 so long as a D. C. voltage is being generated by the generator 1 in its build-up period. Upon the conversion of the generator 1 to A. C. generation by operation of relay 20, the selector relay 32 is operated to connect the normal load $Z_L$ across the terminals of generator 1 and disconnect the dummy load 30. Therefore it is apparent that this invention provides an improved method and apparatus for insuring the build-up of a self-excited commutator type alternating current generator, and in addition, provides positive protection for the load of the generator during the voltage build-up period.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In combination, a self-excited, commutator type, dynamoelectric machine having an exciting field winding, a capacitive reactance connected in series relation with said field winding, means providing a direct current conducting path in shunt to said capacitive reactance, whereby said dynamoelectric machine builds up as a direct current generator, and means for opening said direct current conducting path in response to the voltage generated by said dynamoelectric machine, whereby the dynamoelectric machine is converted to alternating current generation.

2. In combination, a self-excited, commutator type, dynamoelectric machine having an exciting field winding, a capacitive reactance connected in series relation with said field winding, a normally closed relay having the contacts thereof connected to provide a shorting connection around said capacitive reactance, and means connecting said relay to be energized by the generated voltage of said dynamoelectric machine to open said contacts, whereby said dynamoelectric machine builds up as a direct current generator and is then converted to an alternating current generator by operation of said relay.

3. In combination, a self-excited, commutator type, dynamoelectric machine having an armature and an exciting field winding connected in shunt to said armature, a condenser connected in series relation with said exciting field winding, a normally closed relay having the contacts thereof connected to provide a shorting connection around said condenser, and means connecting said relay across said armature to be energized by the generated voltage of said dynamoelectric machine to open said contacts, whereby said dynamoelectric machine builds up as a direct current generator and is then converted to an alternating current generator by operation of said relay.

4. In combination, a self-excited, commutator type generator having an exciting field winding, a capacitive reactance connected in series relation with said field winding, a primary load for said generator, a dummy load conducting D. C. current, means for selectively connecting said dummy load or said primary load across the output of said generator in response to the generation of D. C. or A. C. voltage respectively by said generator, means providing a direct current conducting path in shunt to said capacitive reactance, whereby said generator builds up as a direct current generator and supplies said dummy load, and means for opening said direct current conducting path in response to the voltage generated by said generator, whereby said generator is converted to A. C. generation and supplies said primary load.

5. In combination, a self-excited, commutator type, dynamoelectric machine having an exciting field winding, a capacitive reactance connected in series relation with said field winding, means providing a direct current conducting path in shunt to said capacitive reactance, whereby said dynamoelectric machine builds up as a direct current generator, means for opening said direct current conducting path in response to the voltage generated by said dynamoelectric machine, whereby the dynamoelectric machine is converted to alternating current generation, a load for said dynamoelectric machine, and means for connecting said load to said machine only when said machine is generating an A. C. voltage.

6. In combination, a self-excited, commutator type, dynamoelectric machine having an armature and an exciting field winding connected in shunt to said armature, a condenser connected in series relation with said exciting field winding, a normally closed relay having the contacts thereof connected to provide a shorting connection around said condenser, and means connecting relay across said armature to be energized by the generated voltage of said dynamoelectric machine to open said contacts, whereby said dynamoelectric machine builds up as a direct current generator and is then converted to an alternating current generator by operation of said relay, a load for said dynamoelectric machine, and means for connecting said load to said machine only when said machine is generating an A. C. voltage.

7. In combination, a self-excited, commutator type, dynamoelectric machine having an exciting field winding, a capacitive reactance connected in series relation with said field winding, means providing a direct current conducting path in shunt to said capacitive reactance, whereby said dynamoelectric machine builds up as a direct current generator, and means for opening said direct current conducting path in response to the voltage generated by said dynamoelectric machine, whereby the dynamoelectric machine is converted to alternating current generation, a load for said dynamoelectric machine, and a selector relay responsive only to A. C. voltage arranged to be energized by the generated voltage of said dynamoelectric machine, said relay having contacts arranged to connect said load to said dynamoelectric machine upon operation of said relay.

8. In combination, a self-excited, commutator type generator having an exciting field winding, a capacitive reactance connected in series relation with said field winding, a primary load for said generator, a dummy load conducting D. C. current, a selector relay responsive only to A. C. voltage arranged to be energized by the generated voltage of said generator, said relay having one set of normally closed contacts connecting said dummy load across the terminals of said generator and another set of normally open contacts connecting said primary load across the terminals of said generator, whereby said primary load is supplied by said generator only when operating as an A. C. generator, means providing a direct current conducting path in shunt to said capacitive reactance, whereby said generator builds up as a direct current generator and supplies said dummy load, and means for opening said direct current conducting path in response to the voltage generated by said generator, whereby said generator is converted to A. C. generation and supplies said primary load.

CARL S. ROYS.

REFERENCES CITED

The following references are of record in the file of this patent:

FOREIGN PATENTS

| Number | Country | Date |
|---|---|---|
| 408,200 | Great Britain | July 2, 1932 |
| 697,198 | France | Oct. 21, 1930 |

Disclaimer 2,460,714.—*Carl S. Roys*, West Chicago, Ill. ALTERNATING CURRENT GENERA-
TOR. Patent dated Feb. 1, 1949. Disclaimer filed Jan. 20, 1951, by
the assignee, *Nader Engineering Company.*
Hereby enters this disclaimer to claims 1, 2, and 3 of said patent.
[*Official Gazette February 20, 1951.*]